United States Patent [19]

Maruyama et al.

[11] Patent Number: 5,321,538
[45] Date of Patent: Jun. 14, 1994

[54] METHOD FOR GRADATION DISPLAY USING A LIQUID CRYSTAL OPTICAL ELEMENT WITH MINUTE INSULATION PORTIONS ON THE ELECTRODES

[75] Inventors: Tomoko Maruyama, Atsugi; Shuzo Kaneko, Yokohama; Ryoji Fujiwara, Chigasaki; Tomoko Murakami, Atsugi, all of Japan

[73] Assignee: Canon Kabushiki Kaisha, Tokyo, Japan

[21] Appl. No.: 114,397

[22] Filed: Sep. 1, 1993

Related U.S. Application Data

[62] Division of Ser. No. 984,837, Dec. 3, 1992, Pat. No. 5,270,844.

[30] Foreign Application Priority Data

Dec. 6, 1991 [JP] Japan .................... 3-348566

[51] Int. Cl.⁵ ............... G02F 1/1333; G02F 1/1343; G02F 1/13
[52] U.S. Cl. ........................ 359/79; 359/87; 359/100
[58] Field of Search ............ 359/79, 87, 100

[56] References Cited

U.S. PATENT DOCUMENTS

| | | | |
|---|---|---|---|
| 4,408,837 | 10/1983 | Kozaki et al. | 359/79 |
| 4,561,725 | 12/1985 | Hotta | 350/341 |
| 4,655,561 | 4/1987 | Kanbe et al. | 350/350 S |
| 4,692,779 | 9/1987 | Ando et al. | 346/153.1 |
| 4,712,877 | 12/1987 | Okada et al. | 350/350 S |
| 4,740,060 | 4/1988 | Komura et al. | 350/344 |
| 4,765,720 | 8/1988 | Toyono et al. | 350/350 S |
| 4,796,980 | 1/1989 | Kaneko et al. | 350/350 S |
| 4,832,466 | 5/1989 | Nishimura et al. | 350/354 |
| 4,840,462 | 6/1989 | Hartmann | 350/350 S |
| 4,900,135 | 2/1990 | Yuasa et al. | 350/354 |
| 5,054,890 | 10/1991 | Hanyu et al. | 350/344 |
| 5,103,331 | 4/1992 | Taniguchi et al. | 359/81 |
| 5,122,888 | 6/1992 | Iizuka et al. | 359/79 |
| 5,138,473 | 8/1992 | Dijon et al. | 359/100 |

FOREIGN PATENT DOCUMENTS

| | | | |
|---|---|---|---|
| 0407164 | 1/1991 | European Pat. Off. | 359/79 |
| 0448032 | 9/1991 | European Pat. Off. | |
| 2-216128 | 8/1990 | Japan | 359/79 |

OTHER PUBLICATIONS

Patent Abstracts of Japan, vol. 13, No. 303 (P-896) Jul. 12, 1989.
Patent Abstracts of Japan, vol. 14, No. 283 (P-1063) Jun. 19, 1990.
Patent Abstracts of Japan, vol. 15, No. 287 (P-1229) Jul. 22, 1991.
Hartmann, "Ferroelectric Liquid-Crystal Video Display," I.E.E.E., Soc. for Information Display, vol. 30, No. 2 (1989), pp. 99–103.

*Primary Examiner*—Anita P. Gross
*Attorney, Agent, or Firm*—Fitzpatrick, Cella, Harper & Scinto

[57] ABSTRACT

A liquid crystal optical element comprising a pair of electrode substrates having an electrode and a substrate and a chiral smectic liquid crystal disposed between said pair of electrode substrates, wherein an electrode on at least one of said pair of electrode substrates is provided regularly or randomly with minute insulation portions.

6 Claims, 4 Drawing Sheets

ONE PIXEL  ONE PIXEL

METHOD FOR GRADATION DISPLAY USING A LIQUID CRYSTAL OPTICAL ELEMENT WITH MINUTE INSULATION PORTIONS ON THE ELECTRODES

This application is a division of application Ser. No. 07/984,837, filed Dec. 3, 1992, now U.S. Pat. No. 5,270,844.

BACKGROUND OF THE INVENTION

1. Field of the Invention

The present invention relates to a liquid crystal optical element, and more particularly to a liquid crystal optical element using a chiral smectic liquid crystal having the spontaneous polarization and with the optical response to this action.

2. Related Background Art

Ferroelectric chiral smectic liquid crystals as the liquid crystal having the spontaneous polarization have been actively developed for the usages of a display element and a light bulb, because of their noted advantages of high speed responsibility and memory property. Apparatuses utilizing the above-mentioned advantages that have been put to practical use include a light shutter arrays, a high definition display unit with the simple matrix drive, and a light bulb for the high density recording in combination with a photoconductor.

Application is also expected to a motion picture display with the active matrix drive using thin film transistors (TFT), with this characteristics being shown in, for example, U.S. Pat. No. 4,840,462 or Proceeding of the SID, vol. 30/2, 1989 "Ferroelectric Liquid Crystal Video Display". For example, the drive method of this type of liquid crystal optical element is one in which the reset and write signals are inserted in time division into a horizontal period, as described in U.S. Pat. No. 4,840,462. Also, for example, the element for gradation display with the above drive method was fabricated in a process in which an electrode layer 12 is formed on a substrate 11 of glass, then an orientation layer 13 for orienting a chiral smectic liquid crystal 14 is provided, and then subjected to the rubbing, and the chiral smectic liquid crystal 14 is injected thereto, as shown in FIG. 7.

However, in driving the conventional liquid crystal optical element as above mentioned, the following problems generally arose. One of them was that if the DC voltage (DC component) was continuously applied to a chiral smectic liquid crystal for a long time, the response of liquid crystal might be neglected. This cause is considered due to the fact that the deflection of internal ions of liquid crystal is induced by the above DC component to form an electric field. On the contrary, a proposal has been made of cancelling the DC component with the auxiliary pulse. Further, it is considered that with the chiral smectic liquid crystal, internal ions deflected by the spontaneous polarization of molecules themselves will form an electric field. On the contrary, another proposal has been made in which the half tone can be stably formed, without giving the effects of spontaneous polarization to the next frame, by virtue of an element constitution of using a chiral smectic liquid crystal material having a time constant (CR) for relaxing the internal electric field induced by the above spontaneous polarization within a reset interval, for example, as disclosed in European Patent Gazette No. 448,032. However, there was a problem in making the domain gradation of chiral smectic liquid crystal, that at the same time when electric charges are moved between the electrode, the orientation layer and the chiral smectic liquid crystal, the domain gradually expands to exert an adverse influence particularly for realizing the high gradation, owing to the influence of charges moving through the interface of chiral smectic liquid crystal.

Note that the domain gradation is one in which the crest value or pulse width of applied voltage is set at a value corresponding to a gradation to make a display by varying the ratio between the white domain and the black domain within a pixel depending on the applied voltage, as described in U.S. Pat. No. 4,655,561, U.S. Pat. No. 4,712,877, U.S. Pat. No. 4,765,720, and U.S. Pat. No. 4,796,980, for example.

SUMMARY OF THE INVENTION

In the light of the aforementioned drawbacks associated with the conventional arts, it is an object of the present invention to provide a liquid crystal optical element which can obtain stably a desired half tone by improving the influence of domain expansion in making the domain gradation.

The present invention has a first feature in a liquid crystal optical element comprising a pair of electrode substrates having an electrode and a substrate and a chiral smectic liquid crystal disposed between said pair of electrode substrates, wherein an electrode on at least one of said pair of electrode substrates is provided regularly or randomly with minute insulation portions, and a second feature in a liquid crystal optical element comprising a pair of electrode substrates having an electrode and a substrate and a chiral smectic liquid crystal disposed between said pair of electrode substrates, wherein an electrode on at least one of said pair of electrode substrates is formed regularly or randomly with minute insulation portions sufficient to suppress the movement of charges transversal to said electrode.

DETAILED DESCRIPTION OF THE PREFERRED EMBODIMENTS

The liquid crystal for use in the present invention is preferably a chiral smectic liquid crystal exhibiting the ferroelectricity, suitably in the chiral smectic C phase (SmC*) or H phase (SmHI), further SmI*, SmF*, or SmG*. Of course, other liquid crystals useful within a range of the element constitution according to the present invention will also offer sufficient effects as will be described below. In driving such a liquid crystal, heat control may be performed to hold it in a desired temperature range.

A cell is constituted by using an organic film made of, for example, polyimide, polypyrrole, polyvinylalcohol for an orientation layer. In such a constitution, if the movement of charges between the liquid crystal and the orientation film in a direction of film thickness is smoothly made in applying a voltage from the outside for the drive, the deflection of ions due to an external voltage DC component and the spontaneous polarization can be rapidly relieved. In particular, in displaying the gradation at a high frequency such as a television rate, means to decrease the resistances of the liquid crystal as well as the orientation film and reduce the time constant is effective. However, by decreasing the resistance of material, the movement of charges through the interface between the liquid crystal and the orientation film is smoother, but increasing the tendency to expand the domain. This is considered due to the fact that the effects of charge diffusion in a transverse direction have been possibly promoted Thus, by minutely separating the interface between the liquid crystal and the electrode over an entire area of a pixel by an insulation material to prevent the domain from expanding due to the transverse movement of charges, the relaxation of charges in a direction of film thickness can be promptly performed, while the influence of domain expansion is improved, and a desired half tone can be stably displayed.

Figure 1:
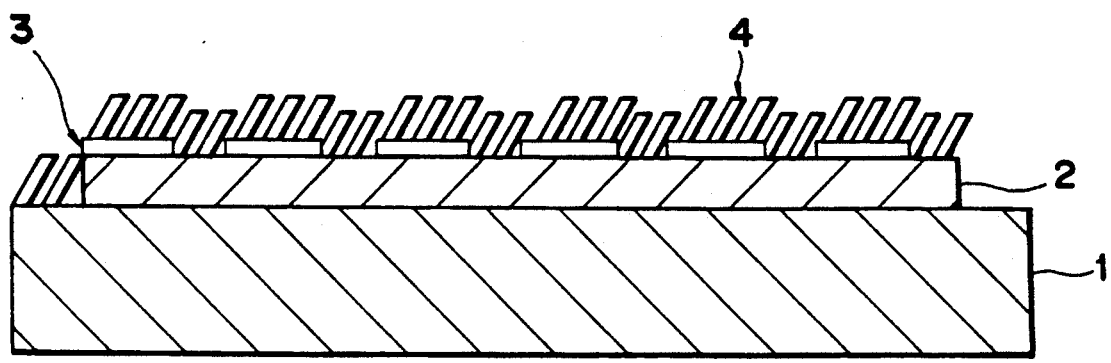
FIG. 1 is a cross-sectional view of a liquid crystal element along the interface of an electrode, according to an embodiment of the present invention.
Figure 2:
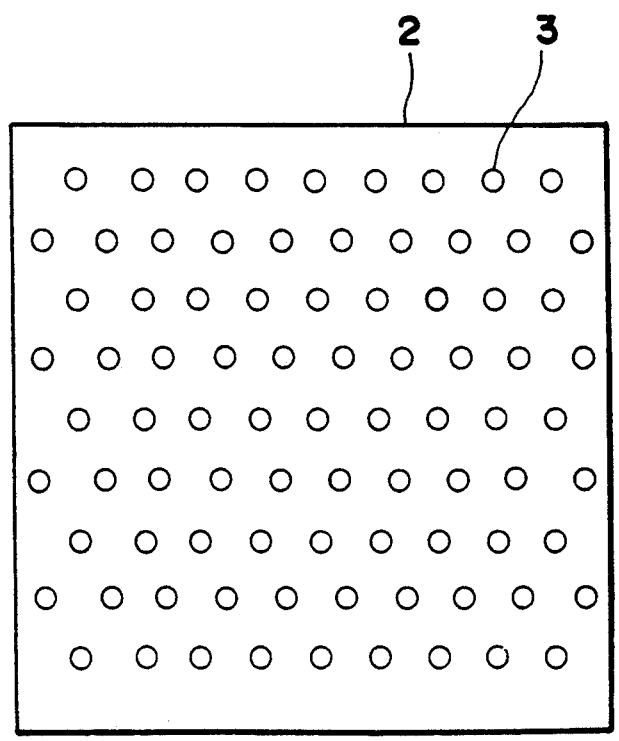
FIG. 2 is a plan view showing an example of an insulation layer arrangement pattern on an electrode of a liquid crystal element according to the present invention.
Figure 3:
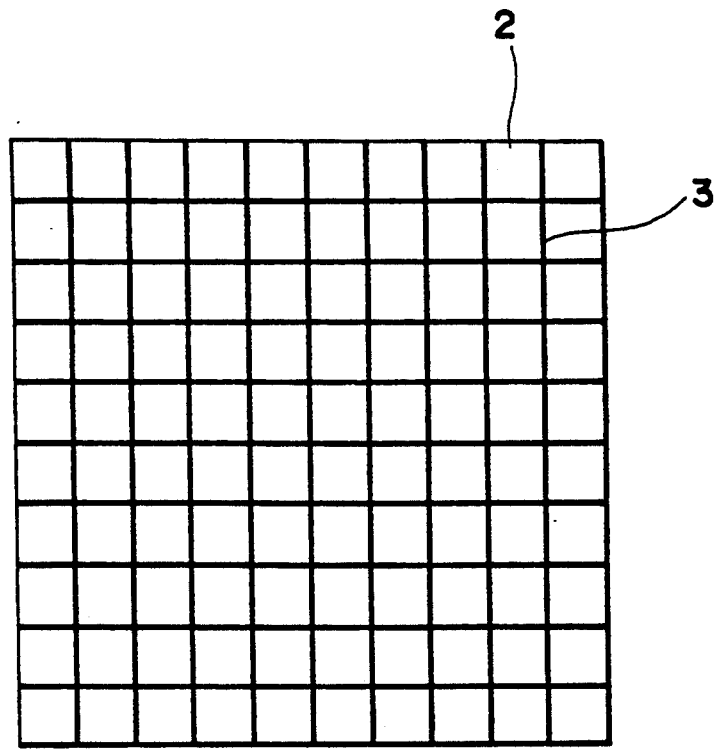
FIG. 3 is a plan view showing another example of an insulation layer arrangement pattern on an electrode of a liquid crystal element according to the present invention.

FIG. 1 is a first embodiment of the present invention. The same figure shows a cross section of a pixel on the substrate on one side of liquid crystal element. This element is fabricated by, for example, providing a transparent electrode 2 (1200 Å) such as ITO on a glass substrate 1 and forming an insulation material 3 into a pattern sufficiently minute relative to the pixel as shown in the figure. Thereafter, to orient the chiral smectic liquid crystal, columns 4 are formed as shown by SiO oblique vapor deposition, for example. This pattern is desirably formed over an entire area of the pixel although the shape of pattern may be arbitrary. For example, a pattern as shown in FIG. 2 or FIG. 3 can be formed. In either figure, the shape of insulation material on the electrode is shown for one pixel as seen from above. FIG. 2 shows an island pattern, and FIG. 3 shows a lattice pattern. The insulation material 3 is made by forming a 300 Å A film of polyimide by spinner coating, and patterning it in a photolithography process. The pattern is formed as large as about 0.4 μm in line width by using a lattice pattern mask as shown in FIG. 3. This line width is sufficiently larger than the diameter of a column made by SiO oblique vapor deposition. With the above constitution, FLC and electrode interface are in good conduction, and transversal expansion of domain is prevented by the insulation pattern, so that the stable half tone can be formed.

Figure 4:
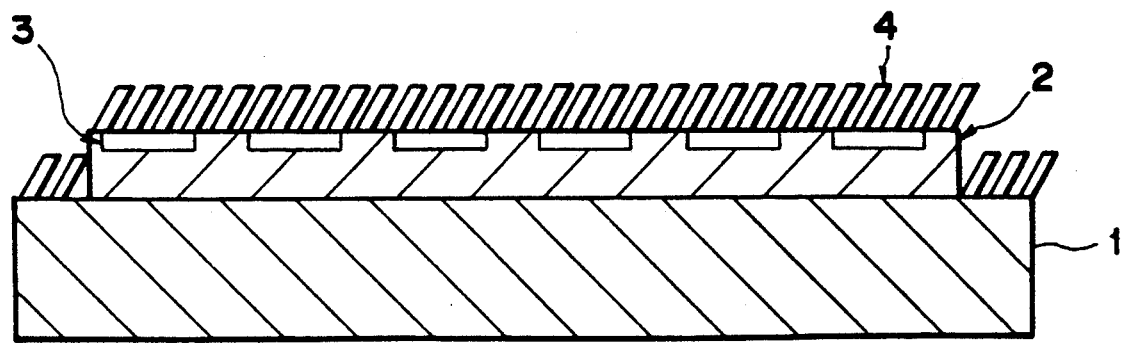
FIG. 4 is a cross-sectional view of a liquid crystal element along the interface of an electrode, according to another embodiment of the present invention.

FIG. 4 shows another embodiment of the present invention. The same figure shows a cross section of a pixel on a substrate on one side of a liquid crystal. This element is made by forming a film of a transparent electrode 2 such as ITO, about 1000 to 1500 Å thick, on a glass substrate 1 by reactive sputtering, retaining the substrate surface at a temperature of 150° to 300° C. in an oxygen atmosphere (about $10^{-3}$ to $10^{-5}$ Torr), and EB drawing a desired pattern. Thereby, the insulation portion can be provided at positions of a lattice pattern 0.5 to 0.1 μm wide, as shown in FIG. 3. Further, columns 4 are formed thereon by SiO oblique vapor deposition to orient FLC. With the above constitution, FLC and electrode interface are in good conduction, and transversal expansion or domain is prevented by the insulation portion 3 formed on the surface of electrode, so that the stable half tone can be formed.

Figure 5:
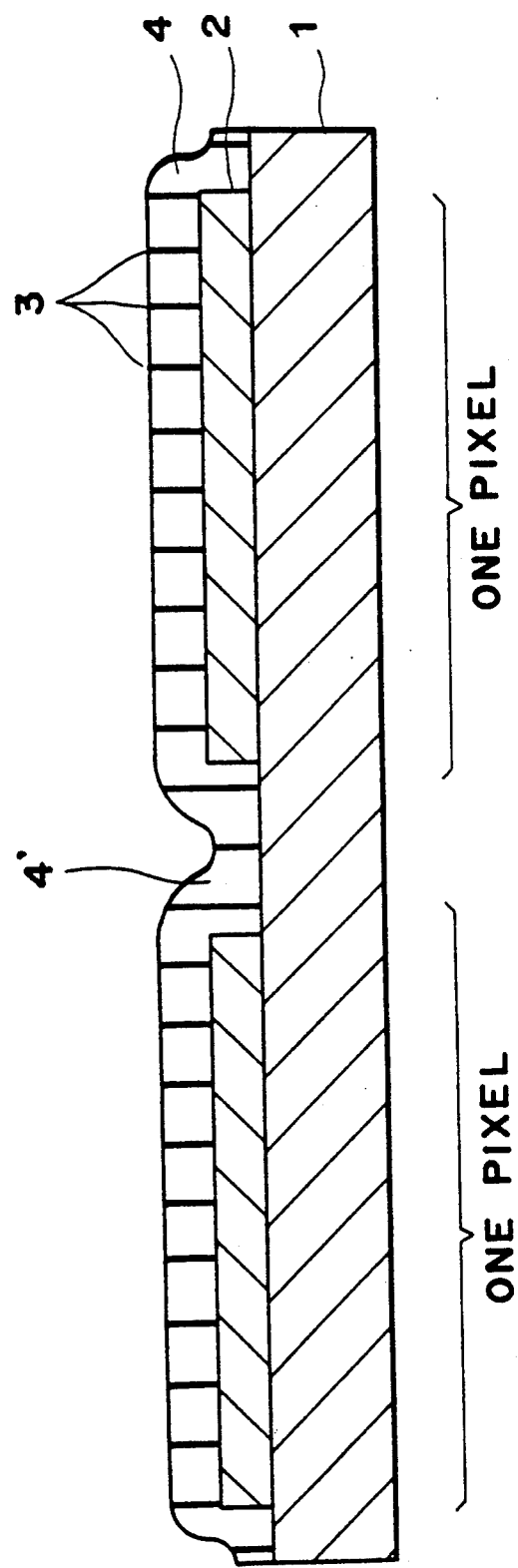
FIG. 5 is a cross-sectional view of a liquid crystal element along the interface of an electrode, according to still another embodiment of the present invention.

FIG. 5 shows the constitution of an element according to another embodiment of the present invention in a cross section of two pixels on a substrate on one side of a liquid crystal. This element is made by forming a film of a transparent electrode 2 such as ITO, about 1000 to 1500 Å thick, on a glass substrate 1 by reactive sputtering, spinner coating thereon a conductive orientation film 4 of polysiloxane polymer having ultrafine particles of $SnO_2$-Sb dispersed thereto and baking it at about 150° C to form the film having a thickness of 500 to 1000 Å. Then, the surface of polysiloxane type conductive film 4 is subjected to a rubbing treatment to provide a gap of 1.3 μm to allow rubbed face to be oriented inwards, into which FLC is injected in vacuum. The conductive polymer 4 is formed as a film by the spinner coating collectively over a liquid crystal panel, so that a conductive polymer layer 4' is also formed between pixels to allow for the film formation, as shown in the figure. These conductive polymer layers 4, 4' are formed into a lattice pattern as shown in FIG. 3 by partially disconnecting the polymer bonding by electron beam to make the isolation. The lattice width is about 0.1 to 0.6 μm. The conductive polymer for use may be polypyrrole which is normally used, in addition to the above cited polymers. As the condition for electron beam, the substrate heating (e.g., 100° to 350° C.) may be conducted depending on the material. Further, a laser may be used, rather than the electron beam. With the above constitution, the chiral smectic liquid crystal and electrode interface are in good conduction, and transversal expansion of domain is prevented or suppressed by the insulation layer portion formed in the conductive polymer film, so that the stable half tone can be formed. Further, when a conductive polymer is used as an orientation layer, without providing oblique vapor deposited columns as shown in the previous embodiment as the orientation layer, the movement of charges between pixels may also occur as shown in FIG. 5, thereby possibly causing a crosstalk. Thus, in this embodiment, pixels are disconnected in a patterning process for forming the insulation portion in the conductive polymer. Thereby, a problem such as crosstalk can be solved.

Another embodiment is such that the insulation portion is provided on a conductive polymer by the same method as in the embodiment of FIG. 5, comparted into a minute lattice within a pixel, and formed thereon with columns by SiO oblique vapor deposition for controlling the orientation. With such a constitution the same effects as in the previous embodiment of FIG. 5 can be obtained.

Figure 6:
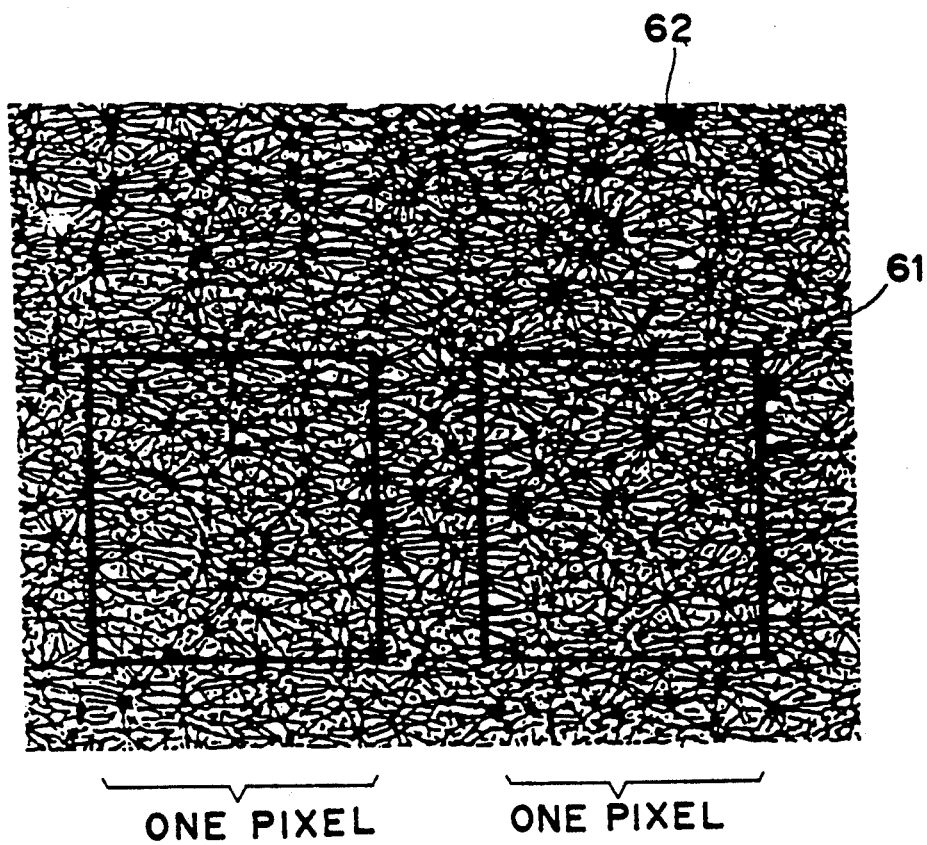
FIG. 6 is a plan view showing n example of an insulation fiber arrangement pattern on an electrode of a liquid crystal element according to an embodiment of the present invention.
Figure 7:
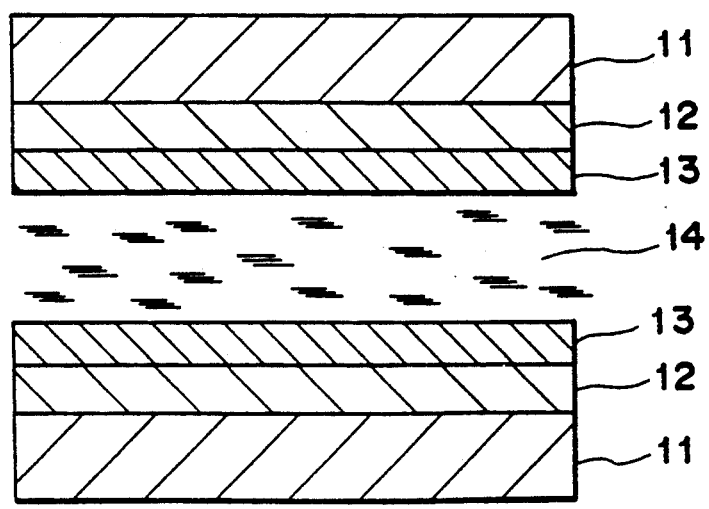
FIG. 7 is a constitutional view of a conventional liquid crystal element.

FIG. 6 shows an electrode surface of adjacent two pixels, in which an ITO electrode 1000 to 1500 Å thick is formed in the same process as in the above embodiment, and bonded with "Floropoa" (trade name) manufactured by Sumitomo Electric Industries, Ltd., and the insulation portion for preventing the transversal spreading of charges within a pixel and between pixels is provided. Further, SiO columns are formed thereon by SiO oblique vapor deposition as a layer for orienting the FLC. "Floropoa" is manufactured by a process of compacting a powder of polytetrafluoroethylene, and drawing it rapidly under the specific conditions to produce a porous member having a structure of very fine fibers called fibrils in varying dimensions such as the thickness of fiber being 0.01 to 5 $\mu$m, and the pore diameter being 0.02 to 15 $\mu$m, for example. Desirably, a high-gradation optical element with 256 gradations uses Floropoa having a fiber thickness of less than 0.1 $\mu$m, and a pore diameter of less than 5 $\mu$m. With the above constitution, the same effects as in the previous embodiments can be obtained. Besides Floropoa, a material formed of fine fibers and having the insulation property can also offer the same effects as above described.

The portion surrounded by the square frame in FIG. 6 is an electrode 61, which defines one pixel. The structure of fine lines in FIG. 6 is a fiber structural member as indicated by numeral 62, with the void portion being a pore portion constituting the porous member having a pore diameter of 0.02 to 15 $\mu$m.

As above described, with the present invention, it is possible to accomplish a stable gradation display without half tone level variation and crosstalk due to transversal expansion of domain by adopting a constitution in which an insulation portion and the other portion are closely adjacent at the interface between an electrode and a liquid crystal within a pixel, and adjacent pixels are isolated.

What is claimed is:

1. A method for gradation display comprising the steps of:

selecting a chiral smectic liquid crystal element comprising a plurality of pixels, each of said pixels comprising a pair of electrodes at least one of which is provided with minute insulation portions, and a chiral smectic liquid crystal disposed between the pair of electrodes, which can be changed between a first orientation state and a second orientation state according to an applied voltage polarity; and applying to the electrodes of at least one of said pixels a voltage according to gradation information in order to produce a half tone defined by a ratio of a display area of the first orientation region to a display area of the second orientation region.

2. A method according to claim 1, wherein an orientation film is formed on at least one of said pair of electrodes.

3. A method according to claim 2, wherein said orientation film is a rubbed polymer film.

4. A method according to claim 1, wherein said minute insulating portions are a porous material.

5. A method according to claim 1, wherein said minute insulation portions are distributed regularly on said electrode.

6. A method according to claim 1, wherein said minute insulation portions are distributed randomly on said electrode.

* * * * *

UNITED STATES PATENT AND TRADEMARK OFFICE
CERTIFICATE OF CORRECTION

PATENT NO. : 5,321,538

DATED : June 14, 1994

INVENTOR(S) : TOMOKO MARUYAMA, ET AL.

It is certified that error appears in the above-identified patent and that said Letters Patent is hereby corrected as shown below:

COLUMN 3

Line 7, "(SmHI)," should read --(SmH*),--.
Line 29, "but increasing" should read --but--.
Line 30, "domain." should read --domain increases.--.
Line 32, "promoted" should read --promoted.--.
Line 59, "A" should be deleted.

Signed and Sealed this

Twenty-second Day of November, 1994

Attest:

BRUCE LEHMAN

*Attesting Officer*  *Commissioner of Patents and Trademarks*